United States Patent [19]
Hagen

[11] Patent Number: 5,827,356
[45] Date of Patent: Oct. 27, 1998

[54] CONTINUOUS PROCESS FOR RECOVERY OF ACETYLENE-FREE GASEOUS MIXTURE

[75] Inventor: Gary P. Hagen, West Chicago, Ill.

[73] Assignee: Amoco Corporation, Chicago, Ill.

[21] Appl. No.: 834,987

[22] Filed: Apr. 7, 1997

Related U.S. Application Data

[60] Provisional application No. 60/021,323, Jul. 8, 1996.

[51] Int. Cl.$^6$ ........................... B01D 47/00; B01D 47/02
[52] U.S. Cl. ................................. 95/238; 95/149; 95/151
[58] Field of Search ............................... 95/37, 149, 151, 95/238; 568/482, 467, 594, 697

[56] References Cited

U.S. PATENT DOCUMENTS

| | | | |
|---|---|---|---|
| 1,796,690 | 3/1931 | Herrmann et al. | 568/594 |
| 2,067,385 | 1/1937 | Evans et al. | 568/379 |
| 2,114,676 | 4/1938 | Contardi et al. | 568/594 |
| 2,197,023 | 4/1940 | Schneider | 568/397 |
| 3,334,148 | 8/1967 | Owen et al. | 95/176 |
| 3,559,378 | 2/1971 | Krause et al. | 95/176 |
| 3,837,144 | 9/1974 | Lewis | 95/184 |
| 4,336,045 | 6/1982 | Fisher et al. | 62/622 |
| 5,260,493 | 11/1993 | Harandi et al. | 568/697 |

OTHER PUBLICATIONS

Article by Hinton and J. A. Nieuwland, J. American Chem. Soc. 52, 2892, Article Entitled: "A New Method of Preparing Acetals. II. Acetals of Monohydric Alcohols".

*Primary Examiner*—Joseph D. Anthony
*Attorney, Agent, or Firm*—Thomas A. Yassen; Robert E. Sloat

[57] ABSTRACT

A continuous process for recovery of acetylene-free gaseous mixture from gaseous feedstreams containing acetylene and optionally other low molecular weight hydrocarbons by contacting the acetylene-containing feedstream with an alkanol in combination with a super acid catalyst, Lewis acid, Bronsted acids, or mixtures thereof, under conditions of reaction sufficient to form a mixture containing at least one acetal organic compound, and a gaseous product substantially free of acetylene. Preferred catalysts include boron trifluoride in methanol with mercuric oxide. Processes according to the invention are, advantageously, used for recovery of acetylene-free gaseous mixture from gaseous feedstreams containing a mixture of acetylene, a synthesis gas comprising dihydrogen and carbon monoxide, and optionally one or more members of the group consisting of dimethyl ether, formaldehyde, ethylene, and propylene.

11 Claims, No Drawings

CONTINUOUS PROCESS FOR RECOVERY OF ACETYLENE-FREE GASEOUS MIXTURE

CROSS-REFERENCE TO RELATED APPLICATION

This application claims the benefit of U.S. Provisional Application No. 60/021,323, filed Jul. 8, 1996, now abandoned which application is specifically incorporated herein, in its entirety, by reference.

TECHNICAL FIELD

The present invention relates to a catalytic process for recovery of acetylene-free gaseous mixture, from gaseous feedstreams containing acetylene and optionally other low molecular weight hydrocarbons. More specifically, it relates to catalytic processes for direct conversation of alkanols with an acetylene-containing feedstream in the presence of a catalyst under conditions of reaction sufficient to form a mixture containing at least one acetal, such as 1,1-dimethoxyethane or other 1,1-dialkoxyalkane, and a gaseous product substantially free of acetylene.

In another aspect this invention relates to a process for upgrading of dilute acetylene-containing feedstreams by conversion of acetylene with one or more lower molecular weight alkanols and/or their condensation products (ethers), optionally in combination with a lower molecular weight aldehyde and/or alkenes, to a mixture containing at least one acetal, such 1,1-dimethoxyethane or other 1,1-dialkoxyalkane. Such processes are, advantageously, useful for recover of acetylene-free synthesis gas comprising dihydrogen and carbon monoxide from pyrolysis and/or partial oxidation of hydrocarbon feeds, such as lower molecular weight alkanes, natural gas, or light naphtha.

BACKGROUND OF THE INVENTION

Methane (natural gas) is expected to become a significant feedstock for the production of fuels and chemicals importantly because of the large amounts that become available in crude oil production. Proven technology exists to convert methane by (1) methane pyrolysis to form ethylene-acetylene mixtures or primarily acetylene, and (2) partial oxidation to mixtures of gases containing 5 to 15 mole percent of acetylene. Other gases which may be present in the products of either the partial oxidation or pyrolysis technique are hydrogen, oxygen, nitrogen, water, carbon monoxide, carbon dioxide, methane, ethane, propane, and the like. For example, a typical output stream from a methane pyrolysis plant contains acetylene, hydrogen, methane, ethylene, carbon monoxide, carbon dioxide, nitrogen, and higher acetylenes.

In recent years there has been an upsurge in interest in the production of both chemicals and transportation fuels from non-petroleum carbon sources such as methane, tar sands, oil shale and the like. This interest has focused for lack of good direct conversion processes on indirect processes, which often go through a synthesis gas intermediate with subsequent conversion of the synthesis gas via Fischer-Tropsch and related processes to hydrocarbons and/or oxygenates. Oxygenates, particularly lower alcohols, are common products of such synthesis gas reactions, and high conversion, selective processes to convert an alcohol or a mixture of alcohols to higher molecular weight alcohols have substantial commercial potential.

Typical methods for partial oxidation and/or pyrolysis of hydrocarbon feedstreams consist in reaction for a very limited time at relatively high temperature; in the case of methane, e.g., this temperature is around 1250° C., and quenching the effluent as described, for example, in Kirk-Othmer, "Encyclopedia of Chemical Technology", 3rd ed., N.1, pages 192 to 243.

Acetals are a well-known class of organic compounds which are formed by condensation reaction of alkanols and aldehydes when heated in the presence of hydrogen chloride. Acetals are, typically, named as 1,1-dialkoxyalkanes. For example, synthesis of monohydric acetals, in limited number, have been reported as early as 1923 (S. Reichert, J. H. Bailey, and J. A. Nieuwland, J. American Chem. Soc., 45, 1552 (1923)). More recently synthesis by condensation of anhydrous acetylene with monohydric alkanols into corresponding acetals, such as 1,1-dimethoxyethane, in the presence of boron fluoride in methanol with mercuric oxide has been reported (H. D. Hinton and J. A. Nieuwland, J. American Chem. Soc., 52, 2892 (1930)). Reasonably good yields were reported, however, using anhydrous acetylene without diluent, and only in the presence of a mercuric salt, such as $HgSO_4$ or mercuric oxide.

Methanol is generally made from synthesis gas and ethanol can be made by carbonylation of methanol or more usually from agricultural products by fermentation. Higher alcohols can also result from the catalyzed conversion of synthesis gas. Olefins such as ethylene and propylene are made in large quantities by the cracking of alkanes such as ethane, propane and naphtha. Potentially, additional large amounts of ethylene are available from natural gas by the oxidative coupling of the methane component.

Because of the large amount of methanol available and its problems as a gasoline additive, processes which convert methanol to effective gasoline additives are valuable. Well-known is the Mobil process for converting methanol to gasoline-range hydrocarbons over an aluminum-containing molecular sieve. Little work has been reported on effectively converting alkanols with an acetylene directly to acetals, such as 1,1-dimethoxyethane or other 1,1-dialkoxyalkane.

SUMMARY OF THE INVENTION

Economical processes are disclosed for direct conversation of alkanols with an acetylene-containing feedstream in the presence of a catalyst under conditions of reaction sufficient to form a mixture containing at least one 1,1-dialkoxyalkane, preferably 1,1-dimethoxyethane, and a gaseous product substantially free of acetylene.

In one aspect the invention is a catalytic process for recovery of acetylene-free gaseous mixture from gaseous feedstreams containing acetylene and optionally other low molecular weight hydrocarbons which comprises contacting the acetylene-containing feedstream with at least one alkanol in combination with a catalyst comprising at least one member selected from the group consisting of Lewis acids, Bronsted acids, or mixtures thereof, under conditions of reaction sufficient to form a mixture containing at least one acetal organic compound, and a gaseous product substantially free of acetylene.

In another aspect this invention relates to a process for upgrading of dilute acetylene-containing feedstreams by conversion of acetylene with one or more lower molecular weight alkanols and/or their condensation products (ethers), optionally in combination with a lower molecular weight aldehyde and/or alkenes, to a mixture containing at least one acetal, such 1,1-dimethoxyethane or other 1,1-dialkoxyalkane. Such processes are, advantageously, useful for recovery of acetylene-free synthesis gas comprising dihydrogen and carbon monoxide from pyrolysis and/or partial oxidation of hydrocarbon feeds, such as lower molecular weight alkanes, natural gas, or light naphtha.

BRIEF DESCRIPTION OF THE PREFERRED EMBODIMENTS

Acetylene can be provided to chemical conversion processes of the instant invention in any acetylene-containing feedstream. Suitable sources of acetylene include, commonly, a wet, impure, acetylene-containing stream diluted with one or more of a lower alcohol, a lower aldehyde, a lower ketone, other similar oxygen-containing materials, hydrogen, nitrogen, oxygen, carbon monoxide, carbon dioxide, methane, ethane, propane and the like.

Suitable feedstreams comprise a mixture of acetylene and methanol; a mixture of acetylene, methanol, and dimethyl ether, a mixture of acetylene, methanol and ethylene, a mixture of acetylene, methanol, formaldehyde and ethylene, a mixture of acetylene, methanol, ethylene, and propylene or a mixture of acetylene, methanol and propylene.

Exact composition of the feedstream will depend upon the source, but generally contains between about 1 to about 90 mole percent acetylene, preferably between about 1 and 25 mole percent of acetylene, more preferably between about 5 and 15 mole percent of acetylene, or up to about 90 mole percent of impurities such as those mentioned above. While feedstreams containing as much water as acetylene, even more water than acetylene on a molar basis, can be adapted to chemical conversion processes of the instant invention, preferred acetylene feedstreams contain about 1 mole percent of water and less.

Acetylene-containing synthesis gases are, particularly, advantageous sources of acetylene. There are several commercial methods for production of acetylene-containing synthesis gas, e.g., by partial combustion techniques, including the widely used BASF process and its various modifications with generally similar design. Natural gas or other methane-rich feedstock is mixed with a limited amount of oxygen (insufficient for complete combustion), and fed through a specially designed distributor or burner to a single reaction zone in which ignition occurs. Preheating of the oxygen and ethane, which is usually carried up to 500° C. or above, supplies part of the energy and thus, by using less oxygen, reduces dilution of the acetylene by carbon oxides and hydrogen.

Design of the burner is of considerable importance and has been given particular attention. Combustion must be as brief and uniform as possible across the reaction chamber. Preignition, stability and blow-off of the flame, the possibility of backfiring through the ports of the burner head, and the deposition of carbon on the burner walls depend on the burner design and the velocities of the gas and the flame. The feasibility of partial combustion processes results from the high rates of reaction together with the relatively slow rate of decomposition of acetylene and hydrocarbon to carbon and hydrogen.

Hydrocarbon feedstock can be methane, LPG, or naphtha, and these are separately preheated and mixed with oxygen. Self-ignition occurs if methane is preheated to 650° C. and naphtha to 320° C.

Oxygen, with a purity of 95–98%, is, advantageously, used as the oxidant, because its use gives several economic advantages, including a higher acetylene concentration in the cracked gas which results in lower purification costs. In addition, off-gas obtained after conversion of the acetylene according to the instant invention, contains high concentrations of hydrogen and carbon monoxide which, after further treatment, can be used for the synthesis of methanol or ammonia. The utilization of the off-gas is of considerable importance in establishing satisfactory economics for the partial combustion processes.

Reaction gas is rapidly quenched with injected water or oil at the point of optimum yield of acetylene, which happens to correspond with the point of maximum soot production. Coke will deposit on the walls of the burner and must be removed from time to time by a scraper.

Compositions of cracked gas from methane and naphtha are, for example, as follows:

| BASF Process Cracked Gas Composition (Vol %) | | |
|---|---|---|
| Component/feed | Methane | Naphtha |
| $C_2H_2$ | 8.0 | 9.3 |
| $C_2H_4$ | 0.2 | 0.2 |
| $CH_4$ | 4.2 | 5.0 |
| $CO_2$ | 3.4 | 3.8 |
| CO | 25.9 | 36.9 |
| $H_2$ | 56.8 | 43.2 |
| $N_2$ | 0.8 | 0.7 |
| $O_2$ | 0.2 | 0.2 |
| Other Hydrocarbons | 0.5 | 0.7 |

[1]Kirk-Othmer, "Encyclopedia of Chemical Technology," 3rd ed., N.1, page 220.

Lewis acids and Bronsted acids or mixtures thereof that are conventionally used as catalysts and that are more acidic than ferric chloride and at last as acidic as ferric bromide and preferably at least as acidic as aluminum chloride and that do not decompose under the conditions employed in the method of this invention, are suitable for use as the catalyst in the method of this invention. Suitable Lewis acid catalysts include boron trifluoride, aluminum chloride, aluminum bromide, tantalum pentachloride, antimony pentafluoride, boron trichloride, ferric bromide, sulfonated zirconia, trifluoromethane-sulfonic acid, and "red oil," a complex polar liquid catalyst phase which is synthesized by addition of hydrogen chloride or bromide to a slurry of aluminum chloride. Preferred catalysts include boron trifluoride, boron trichloride, ferric bromide, and trifluoromethane-sulfonic acid, more preferred are boron trifluoride and trifluoromethane-sulfonic acid, and most preferred is boron trifluoride.

Other conventional Lewis acids, such as antimony chloride, bismuth chloride, ferric chloride, tin chloride, titanium chloride, and zinc chloride are not such effective catalysts in the method of the present invention.

The catalyst further comprise, advantageously, an organic solvent, which is, preferably, an alkanol. Many $C_1$ or higher alkanols are suitable for use in a according to the instant invention, including, broadly, $C_1$ to $C_{20}$ alkanols such as methanol, ethanol, a propanol, a butanol, a pentanol, a hexanol, a nonanol, a dodecanol, and the like. The organic solvent is, preferably, a $C_1$ to $C_4$ alkanol, more preferably at least one member of the group consisting of methanol, ethanol, 1-propanol, 2-propanol, 1-butanol, 2-butanol, 2-methyl-1-propanol, and 2-methyl-2-propanol, and most preferably the organic solvent is, methanol.

Preferred catalysts comprise a suitable Lewis acid, as described-herein-above, and a source of mercury, such as a salt or oxide of mercury, more preferably mercuric oxide.

Preferably, the catalyst is boron trifluoride and organic solvent is a $C_1$ to $C_4$ alkanol, more preferably boron trifluoride and organic solvent is at least one member of the group consisting of methanol, ethanol, 1-propanol, 2-propanol, 1-butanol, 2-butanol, 2-methyl-1-propanol, and 2-methyl-2-propanol, and most preferably the catalyst is boron trifluoride and organic solvent is methanol with mercuric oxide.

The catalyst can be employed as a separate immiscible layer such as the aforementioned red oil, or it can be dissolved with the reactants and products in an organic solvent such as methylene chloride or chlorobenzene, or in the alkanol reactants. Thus, depending upon the selection of solvent for the catalyst the feed, alkanol agent and catalyst can be present in a single liquid phase, or the feed and catalyst can be present in separate liquid phases. In the alternative, the catalyst can be in the form of a solid, for example, aluminum chloride deposited or intercalated with graphite. The catalyst is employed in the method of this invention at a level in the range of from about 0.01, preferably from about 0.05, to about 1.0, preferably to about 0.2 mole per mole of alkanol reactant.

Many $C_1$ or higher alkanols are suitable for conversions according to the instant invention, including, broadly, $C_1$ to $C_{20}$ alkanols such as methanol, ethanol, a propanol, a butanol, a pentanol, a hexanol, a nonanol, a dodecanol, and the like. The alkanol is, preferably, a $C_1$ to $C_4$ alkanol, more preferably at least one member of the group consisting of methanol, ethanol, 1-propanol, 2-propanol, 1-butanol, 2-butanol, 2-methyl-1-propanol, and 2-methyl-2-propanol, and most preferably, at least one member of the group consisting of methanol, ethanol, 1-propanol, and 1-butanol.

In general, after the feedstream has passed over and/or through the catalyst it will contain a mixture of acetals at least one of which is of higher molecular weight than any of the starting alkanol or olefin. For example, a mixture of methanol and ethanol and a mixture of methanol, formaldehyde and ethanol produces at least one 1,1-dialkoxyalkane, such as 1,1-dimethoxyethane, 1-methoxy-1-ethoxyethane, 1,1-diethyoxyethane or acetal and a mixture of methanol, ethanol, and 1-propanol produces at least i-butanol; a mixture of methanol and i-propanol produces at least these acetals in addition to variious substituted n-propoxy acetals.

Use of a carrier gas mixed with the feed to the process can be advantageous. Such materials as hydrogen, carbon monoxide, carbon dioxide, a hydrocarbon, and inert gases such nitrogen, argon, and the like may be used to improve the condensation reaction. The use of hydrogen in the process can improve selectivity in the reaction of methanol with another alcohol and, if used, is generally employed in a hydrogen/feed ratio of from about 20:1 to about 1:1, more preferably, about from 10:1 to about 1:1.

If the reaction is performed continuously or batch-wise, the residence time is from 0.1, preferably from about 1, to about 10, preferably to about 5 hours. The reaction temperature is in the range of from about $-10°$ C., preferably from about $-5°$ C., to about $100°$ C., preferably to about $75°$ C. The reaction pressure must be sufficiently high to maintain the catalyst and products in the liquid phase at the particular reaction temperature employed and generally is in the range of from about 0.5, preferably from about 0.8, to about 10, preferably to about 5, atmospheres gauge.

In view of the features and advantages of the continuous process for recovery of acetylene-free gaseous mixture from gaseous feedstreams containing acetylene and optionally other low molecular weight hydrocarbons by contacting the acetylene-containing feedstream with at least one alkanol in combination with a liquid containing an acid catalyst such as a Lewis acid, Bronsted acid, or mixtures thereof, under conditions of reaction sufficient to form a mixture containing at least one acetal organic compound, and a gaseous product substantially free of acetylene in accordance with this invention as compared to the known processes for acetal formation previously used, the following example is given.

EXAMPLES

General

Products were analyzed by three gas chromatographic systems. The fixed gases, carbon monoxide and carbon dioxide along with methane were analyzed by an on-line Hewlett-Packard 5730 gas chromatograph equipped with a thermal conductivity detector and a Chromosorb 106 packed column. Analysis was accomplished by using an external standard calibrated for carbon monoxide, carbon dioxide, and methane. The non-condensable light gases, $C_1$ to $C_6$, were analyzed off-line using a flame ionization detector and a 6 ft N-octane Porosil C column. The peaks were identified and measured by matching retention times with an external standard containing $C_1$ to $C_6$ hydrocarbons.

The condensable materials were collected in a bomb and analyzed with a flame ionization detector equipped with a 30 m capillary column of fused silica containing RSL 160 liquid phases. Peaks were identified by matching retention times of known alcohols, aldehydes, esters, ketones, olefins and paraffins. Many smaller peaks were not identified. The results are expressed in relative weight percents.

The condensable liquids were also measured on a Hewlett-Packard 5730 gas chromatograph equipped with a thermal conductivity detector. A 6 ft×⅛ in Poropak QS column, $^{80}/_{100}$ mesh particles, was used. This system gave w semi-quantitative results for water, $C_1$–$C_6$ alkanols, and some of the lower molecular weight aldehydes, ketones and esters.

EXAMPLE 1

A 100 mL flask was fitted with a dry ice knock-back condenser, dip-tube for gas introduction, and magnetic stirrer. To the flask was added 25 mL of dry methylene chloride, 2 mL of $BF_3$ mono-dimethyl etherate, and 0.34 g of mercuric acetate. A gas mixture containing 10% acetylene by volume in 90% nitrogen was passed through a 1N sodium bisulfite scrubber to remove traces of acetone and then passed through a drying column containing 3A molecular sieve. This gas mixture was sparged into the solution in the flask at a rate of 69.6 sccm. Based on off-gas analysis, initial acetylene conversion was 100 percent, but gradually reduced to about 60 percent after 315 minutes on sparge. Conversions are defined as instantaneous conversions at the time of sparge. Within the test duration concentration of 1,1-dimethoxyethane in solution increased linearly from 0 to 30 weight percent.

EXAMPLE 2

The procedure of Example 1 was repeated with addition of a methanol-based feed in methanol solvent, and it was observed that acetylene, even though diluted to 10 percent in nitrogen in this case, reacted very rapidly with methanol to yield 1,1-dimethoxyethane in virtually 100 percent selectivity. Reaction occurred at ambient conditions, and virtually no acetylene was initially detected in the off gas, thus indicating apparent high conversion.

EXAMPLE 3

The procedure of Example 1 was repeated except with a gas mixture containing 11% acetylene, 5% nitrogen and 84% synthesis gas (2 $H_2$:CO). It was observed that acetylene, even though diluted to 11 percent in synthesis gas in this case, reacted very rapidly with methanol to yield 1,1-dimethoxyethane in virtually 100 percent selectivity. Results were, as shown in Table I, similar to those obtained with nitrogen diluent over a comparable period of sparging. Cumulative acetylene conversion ranged from 77% at 45 minutes to 64% at 380 minutes. During this experiment it was observed that the liquid became translucent gray in color, indicating possible synthesis gas reduction of some mercury salt to metallic state.

TABLE I

Conversation of 11% Acetylene Diluted in Synthesis Gas Feedstream

| Time (min) | $C_2H_2$ in gas (Mole %) | Conversion (apparent) | DMOE in liquid (Weight %) |
|---|---|---|---|
| 5 | 0.887 | 87.1 | |
| 35 | 2.033 | 80.8 | 3.47 |
| 65 | 2.765 | 74.2 | |
| 95 | 2.861 | 73.0 | 8.18 |
| 125 | 2.692 | 75.1 | |
| 230 | 2.548 | 77.9 | 19.1 |
| 260 | 3.626 | 65.9 | |
| 290 | 4.042 | 62.4 | |
| 380 | 6.274 | 44.4 | 29.3 |
| 410 | 7.185 | 34.5 | |

EXAMPLE 4

The procedure of Example 1 was repeated except with a gas mixture containing 10% acetylene and 90% nitrogen. It was observed that acetylene, even though diluted to 10 percent in nitrogen in this case, reacted very rapidly to yield primarily acetaldehyde and ethanol, and low levels of propylene. Results were, as shown in Table II.

TABLE II

Conversation of Acetylene Diluted with Nitrogen Feedstream

| | | | | | |
|---|---|---|---|---|---|
| Temperature °C. | | 371 | 400 | 429 | 450 |
| Time on feed min. | | 150 | 420 | 1005 | 1545 |
| Feeds | | | | | |
| $C_2H_2/N_2$ | sccm | 37.2 | 37.2 | 37.2 | 37.2 |
| $H_2O$ | g/m | 0.007 | 0.007 | 0.007 | 0.007 |
| Conversions, mole percent | | | | | |
| $C_2H_2$ | | 3.03 | 6.56 | 14.84 | 22.36 |
| Selectivities, percent | | | | | |
| Gases | $CO_x$ | 0.00 | 4.00 | 9.11 | 16.44 |
| | CO | 0.00 | 0.00 | 3.05 | 6.28 |
| | $CH_4$ | 0.00 | 0.00 | 1.50 | 2.58 |
| | $CO_2$ | 0.00 | 4.00 | 6.06 | 10.17 |
| | $C_2H_6$ | 0.00 | 0.00 | 0.00 | 0.00 |
| | $C_3H_6$ | 0.00 | 0.44 | 1.00 | 01.96 |
| | $C_4$ | 0.00 | 0.00 | 0.84 | 1.39 |
| | $C_5$ | 0.00 | 0.00 | 0.00 | 0.00 |
| | $C_6$ | 0.00 | 0.00 | 0.00 | 0.00 |
| | $C_{7+}$ | 0.00 | 0.00 | 0.00 | 0.00 |
| | MEE | 0.00 | 0.00 | 0.00 | 0.77 |
| Liquid | AcAld | 87.00 | 61.26 | 54.34 | 55.92 |
| | EtOH | 13.00 | 34.31 | 33.20 | 21.71 |

Where AcAld is acetaldehyde, MEE is _____, and EtOH is ethanol.

COMPARATIVE EXAMPLE A

In this example the procedure described in Example 1 was repeated except that the gas mixture containing 10 percent acetylene by volume in 90 percent nitrogen was passed through a water scrubber to saturate the gas stream with water vapor at ambient temperature, and dimethyl ether was sparged into the solution at a rate of 7.0 sccm. Several off-gas and liquid GC samples were taken and analyzed over a two-hour period. No 1,1-dimethoxyethane was detected in the gas stream or solution.

COMPARATIVE EXAMPLE B

In this example the procedure described in Comparative Example A was repeated except that acetonitrile was utilized as a solvent. Several off-gas and liquid GC samples were taken and analyzed over a two-hour period. No 1,1-dimethoxyethane was detected in the gas stream or solution.

COMPARATIVE EXAMPLE C

Experiments were also carried out with dimethyl ether and water feeds, instead of methanol feed, in a small autoclave at mildly elevated temperature and pressure (30 psig and 35° C. to 40° C.) in order to promote conversion of dimethyl ether. Feed consisting of acetylene, dimethyl ether and water was charged with methylene chloride solvent and boron triflouride-mercuric acetate catalyst package. Dimethyl ether was not converted although a significant amount of acetylene was hydrated to acetaldehyde.

COMPARATIVE EXAMPLE D

In this example the procedure described in Comparitive Example C was repeated except that a feed consisting of dimethyl ether and acetaldehyde was tested under similar conditions. No 1,1-dimethoxyethane was detected in the product mixture, and no significant reactant conversions were observed.

That which is claimed is:

1. A continuous process for recovery of acetylene-free gaseous mixture from gaseous feedstreams containing from about 1 to about 90 mole percent acetylene and optionally other low molecular weight hydrocarbons which comprises contacting the acetylene-containing feedstream with at least one alkanol in combination with a catalyst comprising at least one member selected from the group consisting of Lewis acid compounds, Bronsted acid compounds, or mixtures thereof in an organic solvent, under conditions of reaction sufficient to form a liquid mixture containing at least one acetal organic compound, and a gaseous product substantially free of acetylene.

2. The process of claim 1 wherein the feedstreams comprise a mixture of acetylene and methanol; a mixture of acetylene, methanol and dimethyl ether, a mixture of acetylene, methanol and ethylene, a mixture of acetylene, methanol, formaldehyde and ethylene, a mixture of acetylene, methanol, ethylene, and propylene or a mixture of acetylene, methanol and propylene.

3. The process of claim 1 wherein the catalyst comprises a Lewis acid selected from the group consisting of boron trifluoride, boron trichloride, ferric bromide, and trifluoromethane-sulfonic acid.

4. The process of claim 1 wherein the organic solvent comprises at least one member of the group consisting of methanol, ethanol, 1-propanol, 2-propanol, 1-butanol, 2-butanol, 2-methyl-1-propanol, and 2-methyl-2-propanol.

5. The process of claim 1 wherein the organic solvent comprises methanol.

6. The process of claim 1 wherein the dilute acetylene-containing feedstream comprises a mixture of from about 1 to about 25 mole percent acetylene and a synthesis gas comprising dihydrogen and carbon monoxide.

7. The process of claim 6 wherein the dilute acetylene-containing feedstream further comprises one or more members of the group consisting of dimethyl ether, formaldehyde, ethylene, and propylene.

8. The process of claim 1 wherein the catalyst comprises boron trifluoride.

9. The process of claim 8 wherein the dilute acetylene-containing feedstream comprises a mixture of from about 1 to about 25 mole percent acetylene and a synthesis gas comprising dihydrogen and carbon monoxide.

10. The process of claim 1 wherein the catalyst is boron trifluoride and the organic solvent is methanol with mercuric oxide.

11. The process of claim 10 wherein the dilute acetylene-containing feedstream comprises a mixture of from about 5 to about 15 mole percent acetylene an a synthesis gas comprising dihydrogen and carbon monoxide, and optionally comprises one or more members of the group consisting of dimethyl ether, formaldehyde, ethylene, and propylene.

* * * * *